United States Patent
Krause et al.

(10) Patent No.: US 10,124,854 B2
(45) Date of Patent: Nov. 13, 2018

(54) DOWNHILL GRIP FOR A BICYCLE

(71) Applicant: RTI Sports GmbH, Koblenz (DE)

(72) Inventors: Andreas Krause, Koblenz (DE); Christian Vollmer, Koblenz (DE)

(73) Assignee: RTI SPORTS GMBH, Koblenz (DE)

( * ) Notice: Subject to any disclaimer, the term of this patent is extended or adjusted under 35 U.S.C. 154(b) by 0 days.

(21) Appl. No.: 15/467,650

(22) Filed: Mar. 23, 2017

(65) Prior Publication Data

US 2017/0274957 A1     Sep. 28, 2017

(30) Foreign Application Priority Data

Mar. 24, 2016   (DE) .................... 20 2016 001 959 U

(51) Int. Cl.
B62K 21/26     (2006.01)

(52) U.S. Cl.
CPC .................... B62K 21/26 (2013.01)

(58) Field of Classification Search
CPC ........ B62K 21/12; B62K 21/26; B62K 23/00; B62K 23/02; B62K 23/04; B62K 23/06; B25G 1/10; B25G 1/102
USPC ......................................... D12/178; D8/303
See application file for complete search history.

(56) References Cited

U.S. PATENT DOCUMENTS

| | | | | |
|---|---|---|---|---|
| 245,542 | A * | 8/1881 | Moran ................... | B62K 21/26 15/143.1 |
| 347,054 | A * | 8/1886 | Morse ................... | B62K 21/26 403/343 |
| 2,205,769 | A | 6/1940 | Sweetland | |
| 4,941,232 | A * | 7/1990 | Decker ................... | B25F 5/006 16/421 |
| 6,421,879 | B1 * | 7/2002 | Gratz ................... | B62K 21/26 16/422 |
| 6,652,941 | B1 * | 11/2003 | Chadwick ................ | B32B 7/02 428/35.7 |
| 7,942,077 | B2 * | 5/2011 | Lai ........................ | B62K 21/26 16/421 |
| 8,234,952 | B2 * | 8/2012 | Ting ....................... | B62K 21/26 74/551.8 |
| 8,680,436 | B2 * | 3/2014 | Schmauder .............. | B62J 33/00 219/204 |
| 2003/0192395 | A1 | 10/2003 | Hsu | |
| 2004/0216550 | A1 | 11/2004 | Fallak et al. | |
| 2007/0157758 | A1 * | 7/2007 | Shih ...................... | B62K 21/26 74/551.9 |

(Continued)

FOREIGN PATENT DOCUMENTS

| | | | | |
|---|---|---|---|---|
| DE | 375778 | C | 5/1923 | |
| DE | 9416166 | U1 * | 3/1995 | ............. B62K 21/26 |

(Continued)

OTHER PUBLICATIONS

German Search Report dated Jan. 13, 2017 for German application No. 20 2016001959.8; 6 pgs.

*Primary Examiner* — Adam D Rogers
(74) *Attorney, Agent, or Firm* — Ohlandt, Greeley, Ruggiero & Perle, LLP

(57) ABSTRACT

A downhill grip for a bicycle comprises an inner sleeve. The inner sleeve is enclosed by a grip element. For fixing the downhill bicycle grip to a bicycle handlebar, a fixing element is connectible to the inner sleeve. The grip element has a larger circumference in an outer region than at in an inner region.

10 Claims, 1 Drawing Sheet

(56) References Cited

U.S. PATENT DOCUMENTS

| | | | |
|---|---|---|---|
| 2010/0212453 A1 | 8/2010 | Rouillard | |
| 2011/0277586 A1* | 11/2011 | Yu | B62K 21/26 |
| | | | 74/551.9 |
| 2012/0073400 A1* | 3/2012 | Wang | B62K 21/26 |
| | | | 74/551.9 |
| 2014/0116196 A1 | 5/2014 | Rogers | |

FOREIGN PATENT DOCUMENTS

| | | | | |
|---|---|---|---|---|
| DE | 29709507 U1 * | 7/1997 | | B62K 21/26 |
| DE | 202013103993 U1 * | 9/2013 | | B62K 21/26 |
| DE | 202013007448 U1 | 11/2014 | | |
| DE | 202016105720 U1 * | 1/2018 | | B62K 21/26 |
| EP | 1464571 A2 | 10/2004 | | |
| EP | 2840015 A1 | 2/2015 | | |
| EP | 3187404 A1 * | 7/2017 | | B25G 1/102 |
| FR | 1329169 A * | 6/1963 | | B62K 21/26 |
| JP | 2012240438 A | 10/2012 | | |

\* cited by examiner

DOWNHILL GRIP FOR A BICYCLE

BACKGROUND

1. Field of the Disclosure

The present disclosure relates to a downhill grip for a bicycle.

2. Discussion of the Background Art

When riding a bicycle downhill, it is highly important for the cyclist to have a safe hold on the bicycle grips connected to the bicycle handlebar. To make it possible to exert a high gripping force and thus to ensure a safe hold on the bicycle, such bicycle grips are normally of a cylindrical shape. To avoid twisting, such bicycle grips comprise clip-like clamping elements both on the laterally inner region and on the laterally outer region. Optionally, the surface of the grip elements of known downhill grips for bicycles is strongly structured for further improvement of the hold on the grips. Particularly in case of longer bicycle rides downhill, the problem occurs that the gripping force of the cyclist tends to become weaker.

It is an object of the disclosure to provide an improved downhill grip for a bicycle.

SUMMARY

The downhill grip for a bicycle according to the disclosure comprises an inner sleeve. The inner sleeve is normally made of a hard plastic material, and the inner sleeve has an inner diameter substantially corresponding to the outer diameter of the handlebar so that the bicycle grip can be mounted on the handlebar by the inner sleeve of the grip. The inner sleeve is preferably of a cylindrical shape, wherein it can be provided that at least a part of the inner sleeve extends around the circumference of the handlebar only partially and/or that the inner sleeve does not extend along the entire length of the bicycle grip.

The inner sleeve is surrounded by a grip element made of a relatively soft plastic material. Further, a fixing element is provided for fixing the inner sleeve and thus the entire bicycle grip to the bicycle handlebar. Herein, it is preferred that the fixing element is designed similar to a clamping element and surrounds at least a part of the inner sleeve in circumferential direction. It is preferred that the inner sleeve comprises a clamping region which in the longitudinal direction of the bicycle grip has a width e.g. in the range of 5 to 15 mm, preferably 8 to 12 mm. In this region, the inner sleeve is preferably not shaped as a full cylinder but comprises e.g. one or a plurality of slots so as to allow for clamping attachment of the inner sleeve to the handlebar. However, the connection between the fixing element and the inner sleeve can also be provided in other ways. For instance, the fixing element could be fixed directly on the handlebar and the connection with the inner sleeve could be realized by pins, webs and the like that extend substantially in the longitudinal direction of the bicycle grip. Further, combinations of such fixing variants are possible.

The disclosure provides that, in a laterally outer region, i.e. in a region which in the mounted state of the downhill bicycle grip is arranged laterally outward, the grip element has a larger circumference than in a laterally inner region. The inner region is correspondingly that region which in the mounted state of the bicycle grip is the laterally inward region of the bicycle grip. Thus, in the mounted state, the two inner regions of a pair of bicycle grips are facing toward each other. By enlargement of the circumference in the outer region, the grip element can have a larger thickness in this region. Thereby, the damping properties of the grip element can be improved. This has the effect that the gripping force will fade less rapidly. The particular reason for this is that the ulnar nerve, located in the heel of the hand in the region of the little finger, is subjected to less stress. Thus, the downhill grip for a bicycle of the disclosure offers high comfort with good damping properties. Since, according to the disclosure, the circumference in the inner region of the grip element is smaller than in the outer region, the cyclist will have a good gripping hold around the bicycle grip in this region. This is the region where the bicycle grip is gripped around by the thumb and the index finger. Only by a good grip around it, a safe hold on the bicycle grip, particularly during rides downhill, will be guaranteed. Thus, by the combination of a thicker outer region with a thinner inner region of the grip element, the user comfort can be enhanced while the user's gripping hold is highly reliable.

According to a preferred embodiment of the downhill grip for a bicycle according to the disclosure, the grip element is designed with rotational symmetry with respect to a grip longitudinal axis. Thereby, the gripping safety is further improved. Also the assembly process is facilitated in this manner. The grip element does not necessarily have to be rotationally symmetric along its entire length. Particularly in the region of the fixing element, the grip element can have projections or extensions connected to it, e.g. in partial overlap with the fixing element.

Further, in the design of the grip element, it is preferred that the circumference of the grip element smoothly, i.e. without steps, decreases from the outside to the inside. This makes it possible for the user to grip the downhill bicycle grip at different positions in longitudinal direction, which means e.g. farther inward or farther outward. The outer surface of the grip element could be shaped in a slightly convex or concave manner. Preferred is a continuous decrease of the circumference from the outer to the inner side. Thus, according to a particularly preferred embodiment, the grip element has a conical shape and respectively conically tapers toward the inner region.

According to a preferred embodiment of the downhill grip for a bicycle according to the disclosure, the fixing element at least partially surrounds a clamping region of the inner sleeve. Thus, as provided by a preferred embodiment, there is realized a clamping attachment of the inner sleeve on the bicycle handlebar. Preferably, in the area of the clamping region, the inner sleeve is slotted and/or, when in the mounted state, surrounds the bicycle handlebar only partially.

According to a particularly preferred embodiment, the fixing element is arranged on an inner side of the bicycle grip. Thus, in the mounted state, the fixing element is facing inward. In other words, in the mounted state, the two fixing elements of a pair of bicycle grips are facing toward each other. In the outer region of the bicycle grip, preferably no fixing element is arranged. It is particularly preferred that the bicycle grips have only a sole fixing element provided thereon which is arranged on the inner side of the bicycle grip. This has the particular advantage that the cyclist can seize the grip at a position far toward the outside and that, also in this region, there is still guaranteed a corresponding dampening effect due to the grip element. A fixing element arranged on the outer side would be disturbing and would not be dampening anymore.

The fixing element can be designed as a clamping element similar to a clip. In such an embodiment, the clamping element comprises a fastening element such as e.g. a screw, a lever, an eccentric or the like. Since, according to a preferred embodiment, the grip element is configured with rotational symmetry and a downhill bicycle grip does not comprise a barend or the like, only relatively small moments of rotation will occur in spite of the intensive use during downhill rides and the large stresses. In view of this, it is possible to fix the fastening element by use of a relatively small moment of rotation. In the bicycle grip of the disclosure, moments of rotation in the range of about 3 Nm are sufficient.

According to a particularly preferred embodiment, the downhill grip for a bicycle according to the disclosure has a diameter in its outer region in the range from 30 to 34 mm, preferably 30 to 32 mm. In the inner region, the grip element has a has a diameter in the range from 28 to 30 mm, preferably 29 to 30 mm. The length of the grip element is preferably in the range from 80 to 120 mm. Thus, according to preferred embodiment, the conicity along a length in the range from 80 to 120 mm is 1 to 3 mm and with particular preference only 1 to 2 mm.

BRIEF DESCRIPTION OF THE DRAWINGS

A full and enabling disclosure of the present disclosure, including the best mode thereof, enabling one of ordinary skill in the art to carry out the disclosure, is set forth in greater detail in the following description, including reference to the accompanying drawing in which.

DETAILED DESCRIPTION OF THE PREFERRED EMBODIMENT

Figure 1:
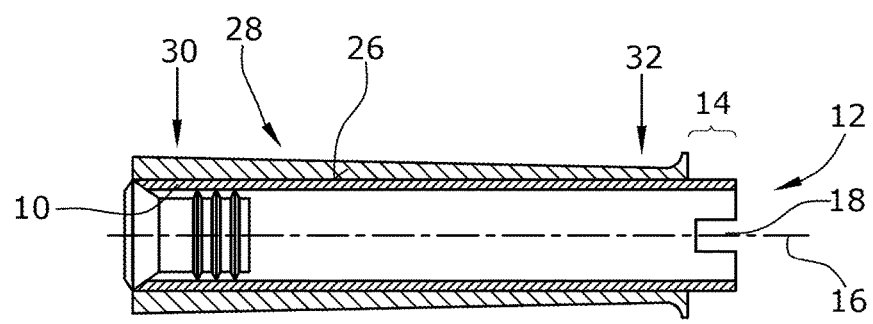
FIG. 1 is a schematic longitudinal sectional view of a downhill grip for a bicycle.
Figure 2:
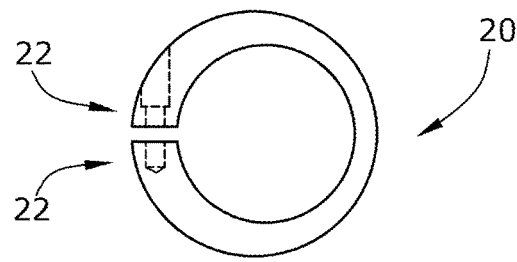
FIG. 2 is a schematic plan view of a fixing element.

The downhill grip for a bicycle comprises an inner sleeve 10 made of hard plastic material such as e.g. PP-GF. Inner sleeve 10 is of a cylindrical shape and has an inner diameter substantially corresponding to the outer diameter of the bicycle handlebar. On an inner side 12, i.e. on a side which in the mounted state is facing inward in the direction of the handlebar stem, said inner sleeve 10 comprises a clamping region 14. Further, inner sleeve 10 comprises a clamping slot 18 which in the illustrated exemplary embodiment extends in the longitudinal direction. Thereby, it is possible, with the aid of a fixing element 20 such as e.g. a clip (FIG. 2), to reduce the inner diameter of inner sleeve 10 in the clamping region 14 for clamping fixation on a bicycle handlebar. In the illustrated exemplary embodiment, the fixing element 20 which in the illustrated exemplary embodiment is designed as a clamping element, has an annular shape and comprises two thickened portions 22 having a mutual distance. With the aid of a fastening element formed as a screw, this distance can be reduced, thus reducing the inner diameter of fixing element 20.

On an outer surface 26 of inner sleeve 10, a grip element 28 is arranged. Sleeve 10 can be bonded to grip element 28, or sleeve 10 can have the grip element 28, which is made of a soft plastic material, injection-molded around it. For safe connection, sleeve 10 can also comprise e.g. recesses or openings which are penetrated by the material of grip element 28. As a material for the grip element 28, particularly TPE is suited.

In the illustrated exemplary embodiment, the grip element 28 is of a conical shape starting from an outer region 30 toward an inner region 32. Thereby, in the inner region where the grip element 28 has the thumb and the index finger gripping around it, the grip element 28 has a smaller outer diameter than in the outer region 30 where it is gripped by the little finger. Thus, in this region, the grip element 28 is thicker so that a better damping is realized and the stress on the ulnar nerve will be minimum.

The grip element and thus the entire downhill grip of the bicycle are substantially configured with rotational symmetry relative to the longitudinal axis 16 of the grip.

Although the disclosure has been described and illustrated with reference to specific illustrative embodiments thereof, it is not intended that the disclosure be limited to those illustrative embodiments. Those skilled in the art will recognize that variations and modifications can be made without departing from the true scope of the disclosure as defined by the claims that follow. It is therefore intended to include within the disclosure all such variations and modifications as fall within the scope of the appended claims and equivalents thereof.

What is claimed is:

1. A downhill grip for a bicycle, comprising
an inner sleeve,
a grip element enclosing the inner sleeve, and
a fixing element connectible to the inner sleeve, for fixing the downhill grip to a bicycle handlebar,
wherein the grip element has a larger circumference in a laterally outer region than in a laterally inner region,
wherein the fixing element at least partially surrounds a clamping region of the inner sleeve,
wherein the grip element has inner and outer surfaces that are designed with rotational symmetry with respect to a grip longitudinal axis, and
wherein the fixing element is arranged on a laterally inner side of the inner sleeve.

2. The downhill grip for a bicycle according to claim 1, wherein the circumference of the grip element decreases from the outer region to the inner region in a smooth manner.

3. The downhill grip for a bicycle according to claim 1, wherein the circumference of the grip element decreases from the outer region to the inner region in a continuous manner.

4. The downhill grip for a bicycle according to claim 1, wherein the grip element has a conically tapering shape from the outer region to the inner region.

5. The downhill grip for a bicycle according to claim 1, wherein only a sole fixing element is provided.

6. The downhill grip for a bicycle according to claim 5, wherein the circumference of the grip element decreases from the outer region to the inner region in a smooth manner.

7. A downhill grip for a bicycle, comprising
an inner sleeve having a clamping region at a laterally inner side;
a grip element having an inner surface and an outer surface, the inner surface bonded or molded to the inner sleeve so that the grip element encloses the inner sleeve except for the clamping region, the inner and outer surfaces having rotational symmetry with respect to a grip longitudinal axis; and
a fixing element at the clamping region, the fixing element being configured to fix the downhill grip to a bicycle handlebar, wherein the grip element has a larger circumference in a laterally outer region than in a laterally inner region, the laterally inner region being adjacent to the fixing element.

8. The downhill grip for a bicycle according to claim 7, wherein the outer surface of the grip element has a conically tapering shape between the laterally outer region and the laterally inner region.

9. The downhill grip for a bicycle according to claim 7, wherein the outer surface of the grip element has a conical shape between the laterally outer region and the laterally inner region.

10. The downhill grip for a bicycle according to claim 7, wherein the fixing element is the only fixing element.

* * * * *

UNITED STATES PATENT AND TRADEMARK OFFICE
CERTIFICATE OF CORRECTION

PATENT NO. : 10,124,854 B2
APPLICATION NO. : 15/467650
DATED : November 13, 2018
INVENTOR(S) : Krause et al.

Page 1 of 1

It is certified that error appears in the above-identified patent and that said Letters Patent is hereby corrected as shown below:

On the Title Page

Item (73) please correct "RTI SPORTS GMBH" To "ERGON INTERNATIONAL GMBH."

Signed and Sealed this
Thirtieth Day of July, 2019

Andrei Iancu
*Director of the United States Patent and Trademark Office*